United States Patent
Fulton et al.

(10) Patent No.: US 9,577,499 B2
(45) Date of Patent: Feb. 21, 2017

(54) RESOLVER WITH MOUNTING STRUCTURE AND METHOD

(71) Applicant: Remy Technologies, LLC, Pendleton, IN (US)

(72) Inventors: David Fulton, Anderson, IN (US); Arlen Phillip Suter, Pendleton, IN (US); George Pelton, Pendleton, IN (US); Jim Shaw, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 784 days.

(21) Appl. No.: 14/020,307

(22) Filed: Sep. 6, 2013

(65) Prior Publication Data
US 2014/0070649 A1 Mar. 13, 2014

Related U.S. Application Data

(60) Provisional application No. 61/698,052, filed on Sep. 7, 2012.

(51) Int. Cl.
*H02K 19/00* (2006.01)
*H02K 15/00* (2006.01)
(Continued)

(52) U.S. Cl.
CPC ............... *H02K 19/00* (2013.01); *G01D 5/12* (2013.01); *G01D 5/2046* (2013.01);
(Continued)

(58) Field of Classification Search
CPC ...... H02K 19/00; H02K 11/225; H02K 24/00; H02K 11/0031; H02K 11/0015
(Continued)

(56) References Cited

U.S. PATENT DOCUMENTS

| 4,631,510 A | 12/1986 | Nagarkatti et al. |
| 6,628,021 B2 | 9/2003 | Shinohara et al. |

(Continued)

FOREIGN PATENT DOCUMENTS

| JP | 2011-172345 A | 9/2011 |
| JP | 2012-157180 A | 8/2012 |

OTHER PUBLICATIONS http://www.engineeringtoolbox.com/relative-permittivity-d_1660.html.*

(Continued)

*Primary Examiner* — Terrance Kenerly
(74) *Attorney, Agent, or Firm* — Bose McKinney & Evans LLP

(57) ABSTRACT

An apparatus including a rotating member, a resolver and a mounting structure. The resolver includes a resolver stator and a resolver rotor fixedly mounted on the rotating member via a mounting structure. The mounting structure has a low magnetic relative permeability and isolates the resolver rotor from the rotating member by preventing direct contact between the rotating member and the resolver rotor. The disclosed apparatus may be an electric machine having a rotor fixed to the rotating member and be suitable for use in a hybrid vehicle. The mounting structure advantageously has a relative permeability of no greater than about 2 and may be formed out of stainless steel material. The rotating member may be a rotor hub formed out of steel material having a relative permeability of at least about 50.

17 Claims, 8 Drawing Sheets

(51) Int. Cl.
   *G01D 5/12*    (2006.01)
   *H02K 24/00*    (2006.01)
   *G01D 5/20*    (2006.01)

(52) U.S. Cl.
   CPC ........... *H02K 11/225* (2016.01); *H02K 15/00* (2013.01); *H02K 24/00* (2013.01); *Y10T 29/49012* (2015.01)

(58) Field of Classification Search
   USPC .................................................. 310/91, 68 B
   See application file for complete search history.

(56) References Cited

U.S. PATENT DOCUMENTS

| | | | |
|---|---|---|---|
| 6,666,289 B2 | 12/2003 | Shimizu | |
| 7,030,532 B2 | 4/2006 | Kobayashi et al. | |
| 7,157,906 B2 | 1/2007 | Miya | |
| 7,268,451 B2 | 9/2007 | Hertz et al. | |
| 2002/0053842 A1* | 5/2002 | Suzuki | H02K 7/003 310/68 B |
| 2005/0168091 A1 | 8/2005 | Miya | |
| 2006/0043815 A1 | 3/2006 | Miya et al. | |
| 2007/0138902 A1* | 6/2007 | Ahn | D06F 37/304 310/261.1 |
| 2007/0216242 A1 | 9/2007 | Tagawa | |
| 2010/0109491 A1 | 5/2010 | Miyazaki et al. | |
| 2012/0206131 A1 | 8/2012 | Takei et al. | |
| 2012/0217828 A1 | 8/2012 | Takei et al. | |

OTHER PUBLICATIONS

International Preliminary Report on Patentability and Written Opinion; PCT/US2013/058451; Mar. 19, 2015; 6 pages.
International Search Report and Written Opinion; PCT/US2013/058451; Dec. 20, 2013; 9 pages.

* cited by examiner

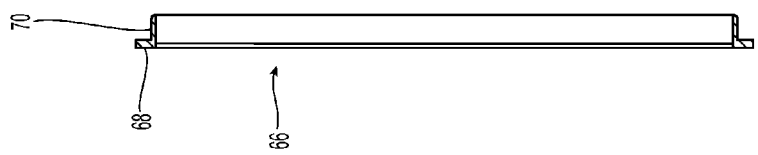
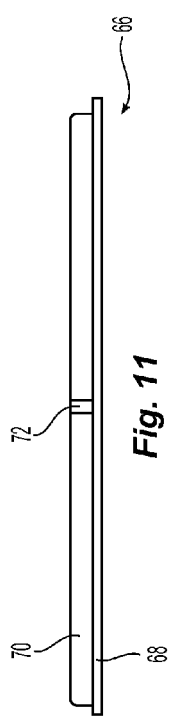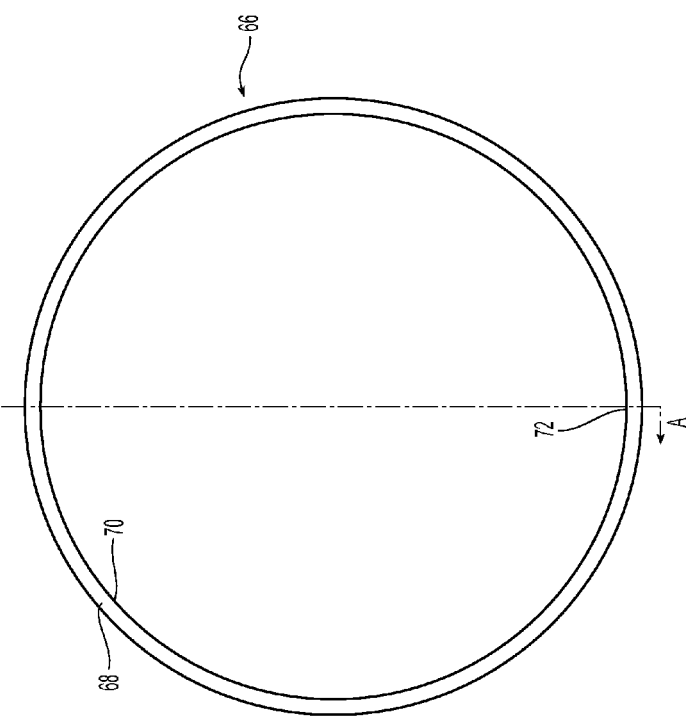

RESOLVER WITH MOUNTING STRUCTURE AND METHOD

CROSS REFERENCE TO RELATED APPLICATIONS

This application claims priority under 35 U.S.C. 119(e) of U.S. provisional patent application Ser. No. 61/698,052 filed on Sep. 7, 2012 entitled MOUNTING STRUCTURE AND METHOD FOR RESOLVER ROTOR the disclosure of which is hereby incorporated herein by reference.

BACKGROUND

The present invention relates to resolvers. Resolvers are used to determine the rotational position and/or rotational speed of a rotating part such as a shaft.

For example, electric machines which are employed as traction motors and generators in hybrid vehicles often employ variable reluctance resolvers to determine the rotational position and speed of the electric machine and thereby provide the precise control necessary to operate the electric machine in cooperation with the other vehicle systems.

Variable reluctance resolvers typically include a stator with a plurality of salient poles and windings mounted thereon and a rotor in which the stator induces a magnetic flux. The rotor typically has an outer perimeter which defines a wave form and, thus, also defines a variable air gap between the resolver rotor and the resolver stator. The magnetic flux induced by the interaction of the resolver rotor and stator and the changes therein due to the rotation of the resolver rotor allows the rotational speed and position of the resolver rotor to be determined as is well-known to those having ordinary skill in the art.

Excessive electromagnetic interference ("EMI") can interfere with the operation of such variable reluctance resolvers and have a negative impact on their performance.

SUMMARY

The present invention provides a mounting structure and method which isolates the rotor of a resolver from a rotating hub or other structure on which the resolver rotor is mounted and thereby limits one potential source of performance-degrading EMI.

A first embodiment comprises, in one form thereof, an apparatus including a rotating member, a resolver and an annular mounting structure. The resolver includes a resolver stator and a resolver rotor with the resolver rotor being mounted on the rotating member. The annular mounting structure is disposed on the rotating member and circumscribes the rotating member. The resolver rotor is disposed on the mounting structure whereby the mounting structure is disposed between and prevents direct contact between the resolver rotor and rotating member. The mounting structure has a lesser magnetic relative permeability than the rotating member.

The disclosed apparatus may, in some embodiments, also include an electric machine having a rotor fixed to the rotating member and be suitable for use in a hybrid vehicle. The mounting structure advantageously has a magnetic relative permeability of no greater than about 2 and may be formed out of stainless steel material. The rotating member may be a rotor hub formed out of steel material having a magnetic relative permeability of at least about 50.

Another embodiment comprises, in one form thereof, an electric machine including a rotor operably coupled with a stator wherein the rotor includes a rotating member. The electric machine also includes a resolver having a resolver stator and a resolver rotor wherein the resolver rotor is mounted on the rotating member and has a magnetic relative permeability of at least about 2,000. An annular mounting structure is disposed on the rotating member wherein the annular member circumscribes the rotating member; the resolver rotor being disposed on the mounting structure whereby the mounting structure is disposed between and prevents direct contact between the resolver rotor and rotating member. The mounting structure has a magnetic relative permeability of no greater than about 2 and the rotating member is formed out of a steel material having a magnetic relative permeability of at least about 50.

In some embodiments of the disclosed apparatus and electric machine, the annular mounting structure may take the form of a sleeve having an L-shaped cross section and an annular plate. In such embodiments, the resolver rotor is positioned radially outwardly of an axially extending leg of the sleeve and axially positioned between a radially extending leg of the sleeve and the plate.

In embodiments including an L-shaped sleeve and annular plate, the rotating member may advantageously include a radially extending surface and a substantially cylindrical surface with together define a substantially perpendicular angle. The sleeve can thereby be mounted on the cylindrical surface and seated against the radially extending surface with a press ring being secured on the cylindrical surface and axially securing the mounting structure and resolver rotor between the radially extending surface and the press ring.

In other embodiments including an L-shaped sleeve and annular plate, the axially extending leg of the sleeve may define a slot with the resolver rotor defining a radially inwardly extending key positioned in the slot. The sleeve is rotationally fixed to the rotating member and engagement of the key and slot prevent rotational movement between the sleeve and resolver rotor.

In still other embodiments including an L-shaped sleeve and annular plate, the embodiment further includes at least one electrically conductive and magnetically permeable shield member positioned to partially enclose the resolver. In such embodiments, the mounting structure advantageously has a magnetic relative permeability of no greater than about 2 and the rotating member has a magnetic relative permeability of at least about 50 and the at least one shield member together with the rotating member substantially enclose the resolver.

Another embodiment comprises, in one form thereof, a method of manufacturing an apparatus. The method includes providing the apparatus with a rotating member, providing a resolver having a resolver stator and a resolver rotor and mounting the resolver stator wherein the rotating member rotates relative to the resolver stator. The method also includes mounting an annular mounting structure on the rotating member wherein the annular mounting member circumscribes the rotating member and the mounting structure has a lesser magnetic permeability than the rotating member. The method additionally includes mounting the resolver rotor on the annular mounting structure wherein the resolver rotor does not directly contact the rotating member.

In some embodiments of the method, the annular mounting structure includes a sleeve having an L-shaped cross section and an annular plate wherein the steps of mounting the annular mounting structure and mounting the resolver rotor include mounting the resolver rotor on an axially extending leg of the sleeve and securing the resolver rotor between the annular plate and a radially extending leg of the sleeve.

In still further embodiments of the method, the rotating member may include a radially extending surface and a substantially cylindrical surface which together define a substantially perpendicular angle. The sleeve is mounted on the cylindrical surface and seated against the radially extending surface and the method may further include securing a press ring on the cylindrical surface to axially secure the mounting structure and resolver rotor between the radially extending surface and the press ring. The sleeve and the annular plate may advantageously be formed out of a stainless steel material in such an embodiment.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 10 is an axial view of an isolator sleeve.

FIG. 11 is a side view of the isolator sleeve.

FIG. 12 is a cross sectional view taken along line A-A of FIG. 10.

Figure 1:
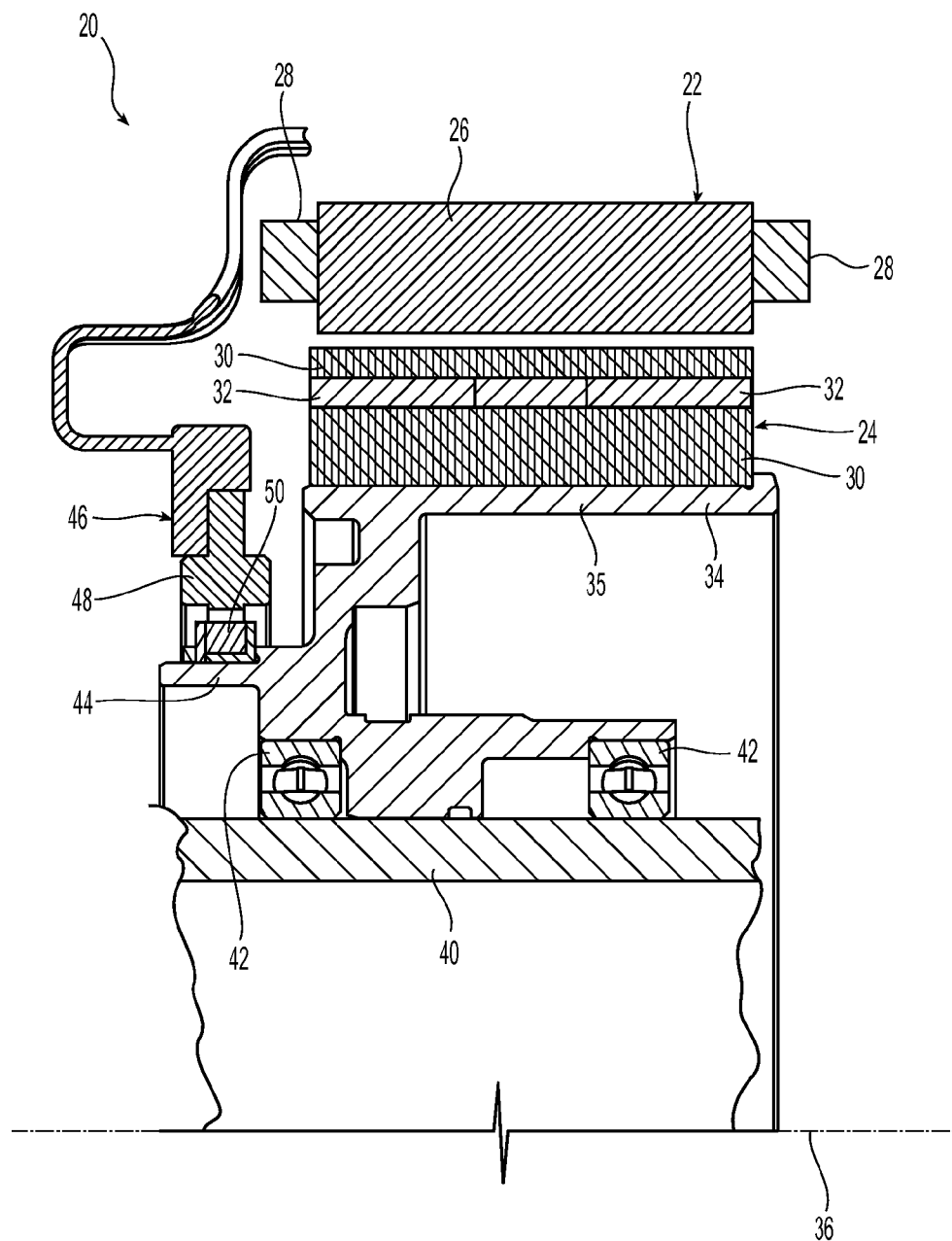
FIG. 1 is a partial schematic cross sectional view of an electric machine.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

An electric machine 20 is depicted in FIG. 1 and includes a stator 22 and a rotor 24. The depicted electric machine 20 is an internal permanent magnet electric machine which is suitable for use in a hybrid vehicle as a traction motor and generator. The present invention, however, is not limited to such applications and may be used with any application for which the use of a resolver is advantageous. It is also noted that FIG. 1 is a partial view which has been simplified for purposes of graphical clarity and does not depict that half of electric machine 20 below rotational axis 36 and omits portions of electric machine above axis 36.

Stator 22 has a conventional structure and includes a stator core 26 formed out of stacked electrical steel laminations and wire coils or windings 28. Rotor 24 also has a conventional structure and has a rotor core 30 formed out of stacked electrical steel laminations having axially extending slots. Permanent magnets 32 are installed in the axially extending rotor slots. Rotor 24 is mounted on a hub 34 and defines a rotational axis 36. Both rotor 24 and hub 34 are substantially symmetrical and concentrically disposed about rotational axis 36.

Stator core 26 and rotor core 30 of electrical machine 20 can be formed out of stacked electrical steel laminations. For example, progressive die assemblies can be used to stamp the laminations out of a sheet stock material. Electrical steel laminations are formed out of an iron alloy and typically include silicon in amounts which may range up to approximately 6.5% but are typically no greater than approximately 2 to 3.2%. Magnesium and aluminum, in amounts up to approximately 0.5%, may also be used in electrical steel. Electrical steel is widely available and the use of electrical steel laminations to form stator and rotor cores is well-known to those having ordinary skill in the art.

The laminations forming stator core 26 and rotor core 30 can be secured together by welding, adhesives, inter-engaged tabs and slots in adjacent laminations, or by other suitable methods. For example, one adhesive method of securing laminations involves the use of a two part epoxy wherein one part is applied to the bottom surface of each of the laminations and the other is applied to the top surface of each of the laminations. Once stacked, the laminations are heated to adhere the two parts together and form a bonded core.

Magnets 32 may either be magnetized prior to installation in rotor core 30 or may be non-magnetized when installed and have magnetic properties imparted to them after installation in rotor core 30. Magnets 32 may be advantageously formed out of neodymium iron boron. Dysprosium may be included when forming magnets 32 to provide greater temperature stability and allow the magnetic material to better resist the loss of magnetism. A variety of other materials may also be used to form magnets 32 including rare earth materials such as lithium, terbium and samarium. The use of these and other magnetic materials to form permanent magnets for use in electric machines is well-known to those having ordinary skill in the art. Magnets 32 may also include an outer layer of material such as a layer of nickel formed on the magnetic material by electroplating or a layer of aluminum formed by vapor diffusion that forms an outer coating on the magnet. Such outer coatings can be used to enhance resistance to corrosion.

Electric machine 20 is mounted within housing 38. A ground sleeve 40 is bolted to housing 38 and extends parallel with and concentrically about rotational axis 36. Bearing assemblies 42 rotationally support rotor hub 34 on ground sleeve 40. A clutch (not shown) is used to selectively engage rotor hub 34 with an external shaft coupled to the drive system of the vehicle whereby electric machine 20 can be selectively engaged as either a traction motor or as a generator.

Rotor core 30 is mounted on hub 34 in a suitable manner which rotationally fixes rotor core 30 to rotor hub 34. Advantageously, rotor core 30 has a central bore which defines an interference fit with rotor hub 34. To mount rotor core 30 on rotor hub 34, rotor core 30 is heated to thereby expand the size of rotor core 30 and allow hub 34 to be inserted within the central bore of rotor core 30. When both rotor core 30 and rotor hub 34 equalize at the same temperature, rotor core 30 will be fixed to rotor hub 34. Rotor hub 34 may also be chilled prior to insertion of rotor hub 34 into rotor core 30 to facilitate the mounting of rotor core 30 on a first section 35 of rotor hub 34.

At the axial end of rotor hub 34 opposite the clutch assembly, a second section 44 of rotor hub 34 defines a cylindrical projection or stub. Resolver assembly 46 is coupled with the second section 44 of rotor hub 34. The resolver assembly 46 includes a stator 48 which is secured to housing 38 and a rotor 50 which is mounted on second section 44 of rotor hub 34. In the illustrated embodiment, the first section 35 of rotor hub 34 on which the electric machine rotor 24 is mounted has a larger diameter than the second section 44 of rotor hub 34 on which the resolver rotor 50 is mounted.

Resolver stator 48 defines a circular ring 52 with a plurality of differently oriented windings 54. Wiring 56 and electrical connectors 58 provide electrical communication between windings 54 and control circuitry (not shown). In some embodiments, ring 52 is be formed out of stacked electrical steel laminations with windings 54 disposed on radially inwardly extending poles formed by the stacked laminations. Resolver rotor 50 is formed by a stack of electrical steel laminations 60 which define a circular inner perimeter 62 and an outer perimeter 64. Outer perimeter 64 defines a wave-form shape. The depicted resolver stator 48 and resolver rotor 50 form a variable reluctance resolver and are disposed concentrically about axis 36.

The wave form shape of outer perimeter 64 causes the magnetic flux at each winding 54 to vary based upon the rotational speed of rotor 50. The magnetic flux at each winding 54 also depends upon whether a hill or valley of the wave form defined by the outer perimeter 64 is immediately proximate the winding 54. These variations in the magnetic flux influence the electrical current in windings 54 and thereby allow the rotational speed and position of resolver rotor 50 relative to resolver stator 48 to be determined as is well-known to those having ordinary skill in the art. Because both electric machine rotor 24 and resolver rotor 50 are fixed relative to rotor hub 34 and both electric machine stator 22 and resolver stator 48 are fixed relative to housing 38, the determination of the speed and location of resolver rotor 50 can be used to determine the rotational speed and position of electric machine rotor 24 relative to electric machine stator 22. Resolver 46 thereby facilitates the operational control of electric machine 20.

Because resolver 46 relies upon the magnetic flux present in rotor laminations 60 and its interaction with windings 54 when determining the rotational speed and position of resolver rotor 50. As a result, the operation of resolver 46 can be negatively impacted by EMI and the EMI generated by operation of electric machine 20 has the potential to alter the magnetic flux or electrical current in rotor laminations 60 or windings 54. External shielding such as shielding members 82, 84 and 86 can be used to limit the influence of EMI on resolver 46. Shielding members 82, 84, 86 are formed out of an electrically conductive and magnetically permeable material. Although shielding members 82, 84, 86 do not fully enclose resolver assembly 46, they do act in a manner similar to a Faraday cage and provide some shielding from the EMI generated by the operation of electric machine 20. As mentioned below, the EMI shielding for resolver assembly 46 provided by shielding members 82, 84, 86 may in some embodiments be potentially enhanced by rotor hub 34 which, in combination with shielding members 82, 84, 86 substantially encloses resolver assembly 46.

In addition to external shielding members 82, 84, 86 the illustrated embodiment also includes a mounting structure 66 for resolver rotor 50 which magnetically isolates resolver rotor 50 from hub 34. Advantageously, mounting structure 66 may also be used electrically isolate resolver rotor 50 from hub 50. In the illustrated embodiment, rotor hub 34 is a weldment formed out of a high hardenability gear steel and a nickel steel. Carbon steels, such as those suitable for forming rotor hub 34, and other ferrous metal materials generally have the ability to support a magnetic field within themselves and their relative magnetic permeability measures this property. For example, carbon steels typically have a relative permeability of about 50 to 100.

As mentioned above, magnetic permeability refers to the ability of a material to support the formation of a magnetic field within itself. A magnetically permeable material will exhibit magnetization in response to an applied magnetic field. Magnetically permeability is measured in henrys per meter or newtons per ampere squared. The permeability constant, $\mu_0$, is defined as the permeability of free space, i.e., a vacuum. The relative permeability of a material is the ratio of the magnetic permeability of that material to the permeability constant. A high relative permeability indicates that the material has a greater ability to support the formation of a magnetic field within itself.

Air has a relative permeability of approximately 1 while highly magnetizable silicon steel, e.g., 4% Si Steel, will often have a relative permeability of at least about 2,000. Laminations formed out of such silicon steel can be used to manufacture stator and rotor cores 26, 30 of electric machine 20 and stator and rotor cores of resolver assembly 46, e.g., rotor laminations 60 can be formed out of such silicon steel. Electrical steel is a type of silicon steel and typically has a relative permeability in a range from about 3,000 to about 8,000 and is well suited for use in the manufacture of stator and rotor cores for electrical machines and variable reluctance resolvers.

An annular isolating sleeve 66 is used to substantially isolate the laminations 60 forming resolver rotor 50 from rotor hub 34 and substantially prevent direct contact between laminations 60 and rotor hub 34. Isolating sleeve 66 is formed out of a low magnetic permeability material to inhibit the transfer of magnetic flux from rotor hub 34 to resolver laminations 60. Aluminum and stainless steel are two materials which are generally considered to be non-magnetic and typically have a magnetic relative permeability falling in a range from about 1 to about 2 and can be used to form sleeve 66 on which laminations 60 are mounted. In the illustrated embodiment, mounting sleeve 66 is formed of stainless steel AISI 304.

Figure 2:
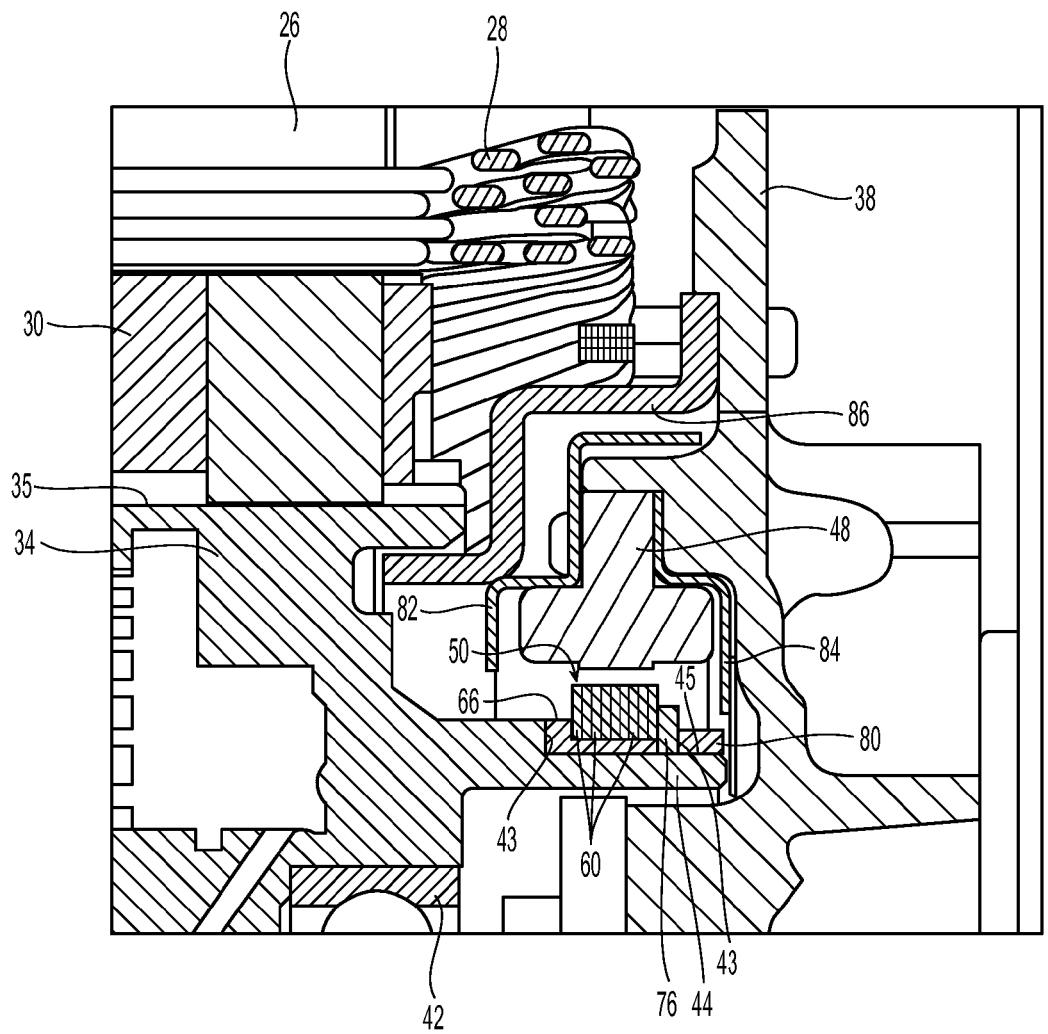
FIG. 2 is a partial cross sectional view of an electric machine and resolver.
Figure 3:
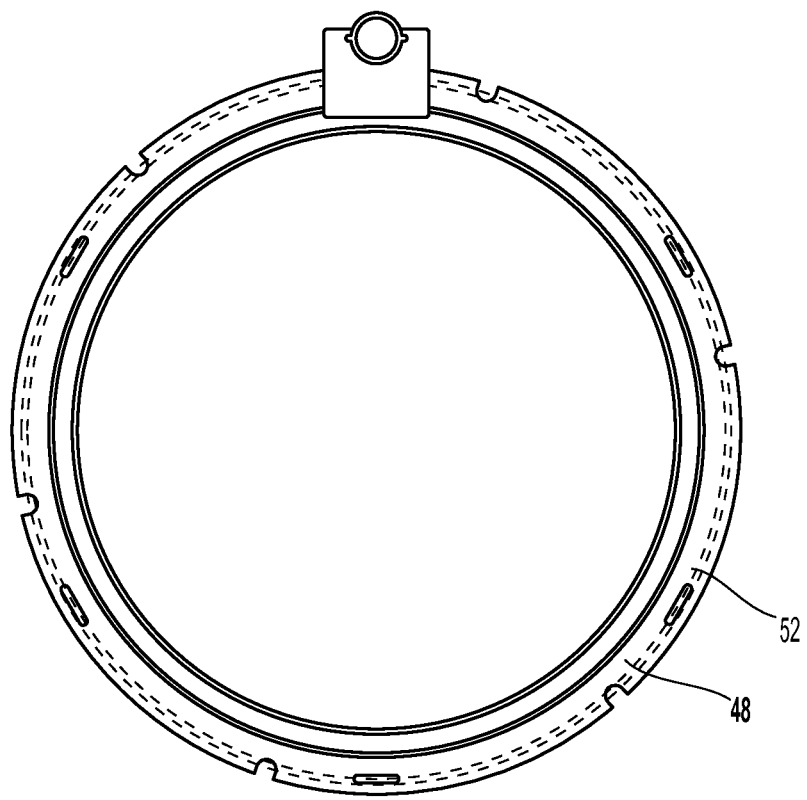
FIG. 3 is an axial view of a resolver stator.
Figure 4:
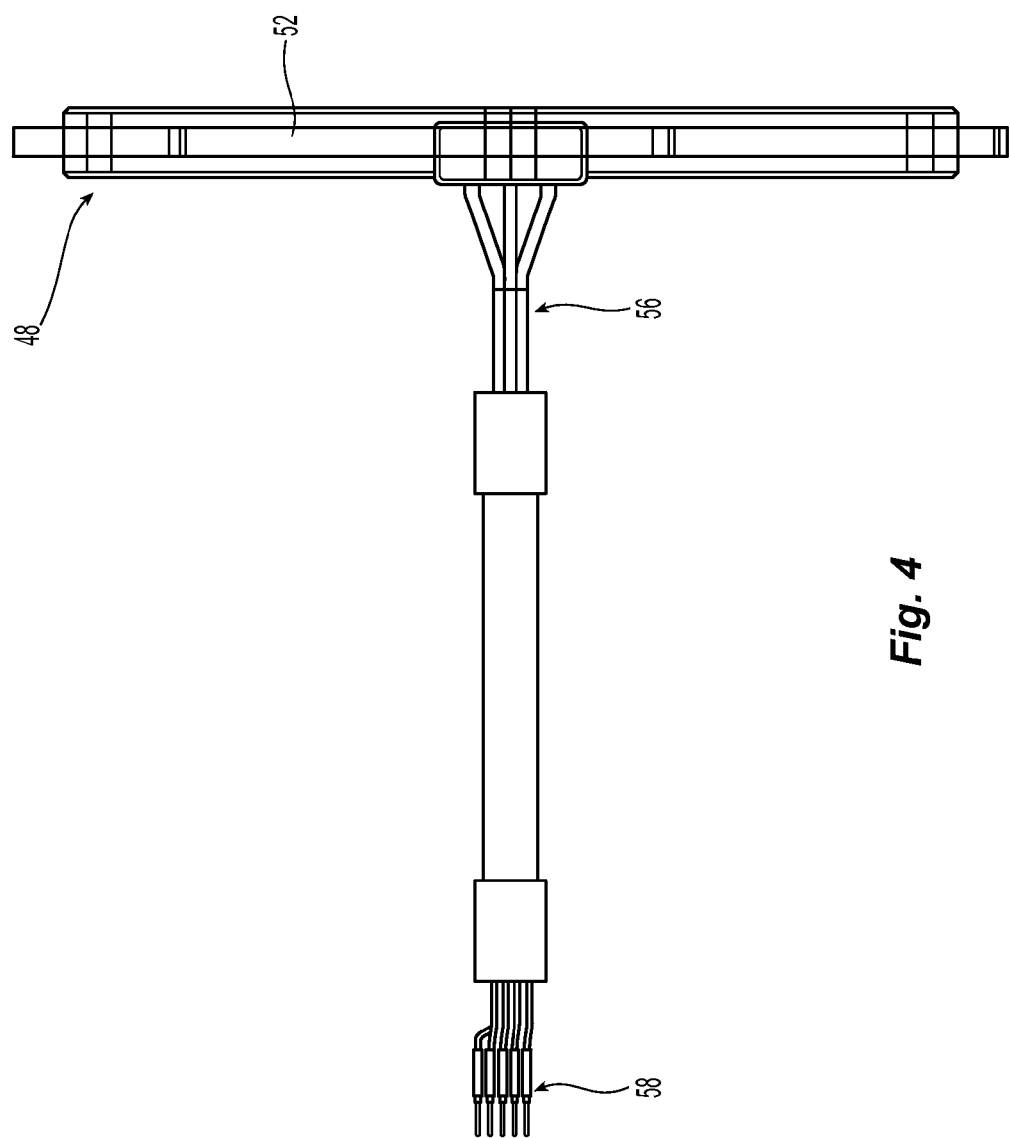
FIG. 4 is a side view of the resolver stator.
Figure 5:
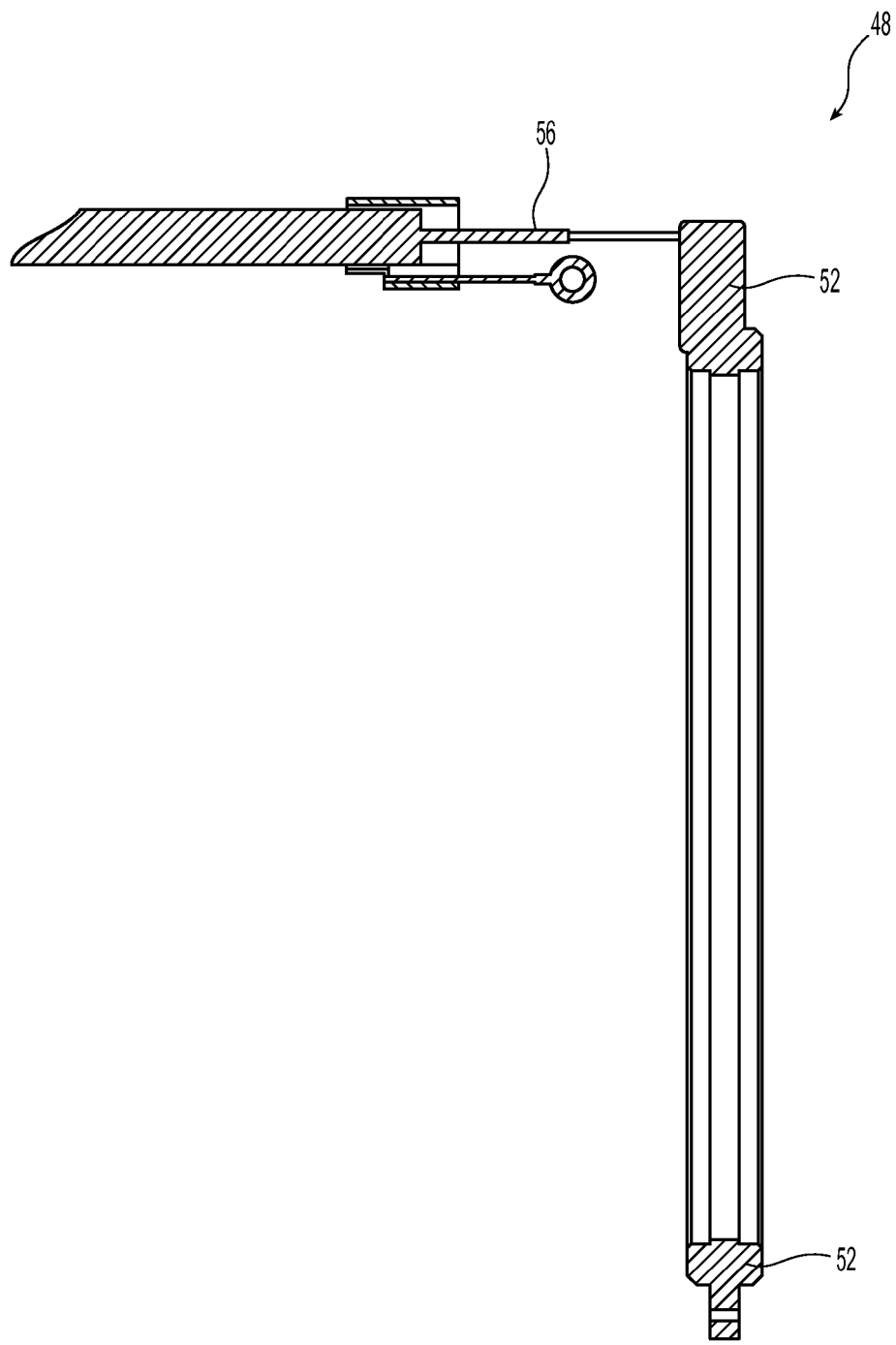
FIG. 5 is a cross sectional side view taken along line A-A of FIG. 3.
Figure 6:
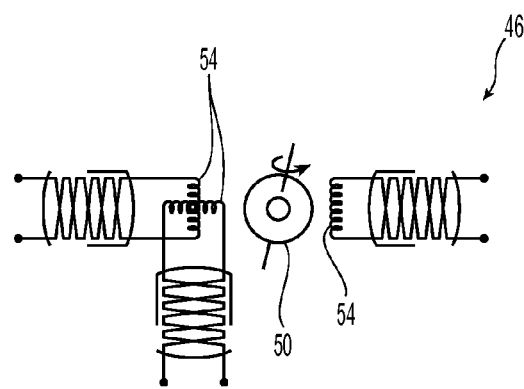
FIG. 6 is a schematic representation of a variable reluctance resolver.
Figure 9:
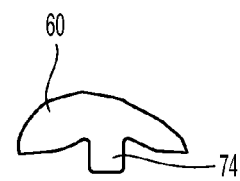
FIG. 9 is a detail axial view of portion A of FIG. 7.
Figure 7:
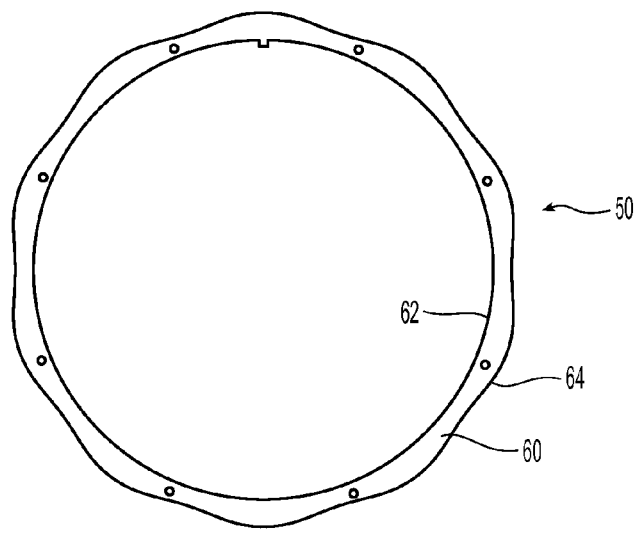
FIG. 7 is an axial view of a resolver rotor.
Figure 8:
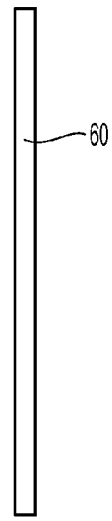
FIG. 8 is a side view of the resolver rotor.
Figures 13, 15:
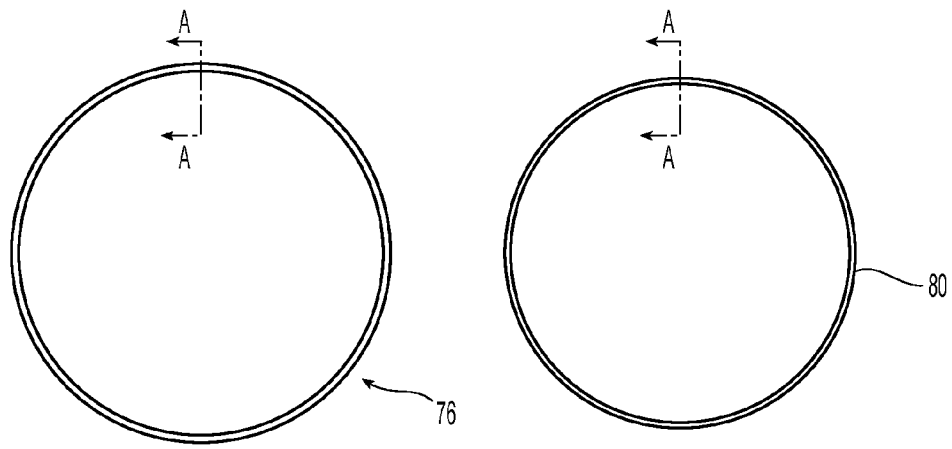
FIG. 13 is an axial view of an isolator plate.
FIG. 15 is an axial view of a press ring.
Figure 16:
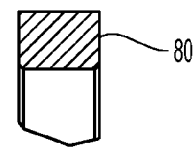
FIG. 16 is a portion of the cross sectional view taken along line A-A of FIG. 15.
Figure 14:
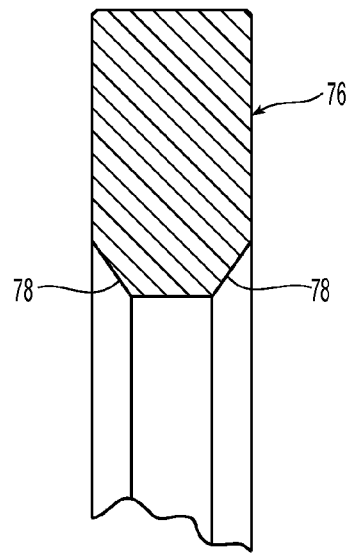
FIG. 14 is a side view of the isolator plate.

Sleeve 66 forms a ring with a generally L-shaped cross section having a radially extending leg 68 and an axially extending leg 70. As can be seen in FIG. 2, the second section 44 of rotor hub 34 on which resolver rotor 50 is mounted steps down from a larger diameter to a smaller diameter. Where second section 44 steps down from the larger diameter to the smaller diameter, rotor hub defines a radially extending surface 43 and a cylindrical surface 45 which define a substantially perpendicular angle. In the illustrated embodiment, L-shaped sleeve 66 is seated at the intersection of surfaces 43 and 45 with radially extending leg 68 engaged with surface 43 and the radially inner surface of axially extending leg 70 engaged with surface 45. Although this configuration is advantageous, alternative configurations which do not provide two perpendicular surfaces for seating of sleeve 66 may also be used.

Laminations 60 are mounted on sleeve 66 with inner perimeter 62 of laminations 60 being engaged with the radially outer surface of axially extending leg 70 whereby radially extending leg 68 is disposed between laminations 60 and surface 43 and axially extending leg 70 is disposed between laminations 60 and surface 45.

Sleeve 66 is fixed to rotor hub 34 whereby sleeve 66 will not rotate or axially slide relative to rotor hub 34. An interference fit can be used to mount sleeve 66 to hub 34. For example, sleeve 66 could be heated to thermally expand sleeve 66 to permit sleeve 66 to be installed on hub 34 and fixed thereto when the temperature of sleeve 66 and hub 34 equalize. Alternative methods of fixing sleeve 66 to hub 34 can also be used, e.g., welding, adhering, fasteners or other suitable means.

Rotor laminations 60 are mounted on sleeve 66 in only a light press-fit to avoid imparting stresses to laminations 60 which might distort the magnetic flux generated therein during operation of resolver 46. To avoid rotational slipping of laminations 60, laminations include a radially inwardly extending key 74 which is received in a key-way or slot 72 formed in leg 70 of sleeve 66.

An annular isolator plate 76 is used to prevent axial movement of laminations 60. Similar to sleeve 66, isolator plate 76 is formed out of a low permeability material, advantageously having a permeability of less than about 2. In the illustrated embodiment, isolator plate 76 is formed out of stainless steel AISI 304. The illustrated isolator plate generally has a flat ring shape similar to that of a conventional washer and abuts the end lamination 60 of resolver rotor 50. A 45 degree chamfer surface 78 on plate 76 is positioned adjacent the distal end of leg 70 of sleeve 66 whereby plate 76 may still engage resolver rotor 50 to press it firmly against leg 68 even if leg 70 extends a slightly greater axial length than the axial dimension of resolver rotor 50.

A press ring 80 is used to secure plate 76. Press ring 80 is formed out of 1045 steel and is securely press fit on hub 34 and axially biases plate 76 toward surface 43. Press ring 80 prevents the axial movement of isolator plate 76 and, thus, also prevents the axial movement of resolver rotor 50. Sleeve 66, laminations 60, plate 76 and press ring 80 are all concentrically disposed about axis 36 in the illustrated embodiment. If the axial biasing force imparted by press ring 80 is sufficiently great, press ring 80 can be used to not only axially secure sleeve 66, laminations 60 and plate 76 but also rotationally secure sleeve 66, laminations 60 and plate 76. Hub 34 extending through the open center of each of sleeve 66, laminations 60, plate 76 and press ring 80, in other words, sleeve 66, laminations 60, plate 76 and press ring 80 all circumscribe rotating member 34.

As can be seen in FIG. 2, sleeve 66 and plate 76 prevent rotor laminations 60 from direct contact with either rotor hub 34 or press ring 80 both of which have a significantly higher magnetic permeability than isolator sleeve 66 and isolator plate 76. Thus, in the illustrated embodiment, resolver rotor 50 is mounted on and isolated from a rotating member, i.e., rotor hub 34, by a mounting structure, i.e., sleeve 66 and plate 76, having a relative permeability of no greater than about 2. Rotating member 34 is advantageously formed out of a steel or other ferrous metal material having a relative permeability of at least about 50 while rotor laminations 60 have a relative permeability of at least about 2,000. In other words, rotating member 34 has a relative permeability that is at least an order of magnitude greater than the isolating mounting structure 66, 76 while resolver rotor laminations 60 have a relative permeability that is an order of magnitude greater than hub 34. As used herein, when a first measure is an order of magnitude greater than a second measure, the first measure is at least about ten times greater than the second measure.

The disclosed embodiment employs an isolating sleeve 66 and isolating plate 76 that not only has a relative permeability of no greater than about 2 but is also formed out of a metal material to provide sleeve 66 and plate 76 with the strength and other material properties to perform in a demanding environment. In alternative embodiments for other applications, however, a resinous, low permeability material may have sufficient strength and other material properties to provide a mounting structure for resolver rotor 50.

The disclosed embodiment inhibits interference with the magnetic flux within rotor 50 due to the proper operation of resolver 46 by using a mounting structure, i.e., sleeve 66 and plate 76, having a low relative permeability to mount rotor 50 on hub 34. Sleeve 66 and plate 76 substantially prevent direct contact between rotor 50 and hub 34. Sleeve 66 and plate 76 also substantially prevent direct contact between rotor 50 and high permeability materials forming parts directly coupled with hub 34 such as press fit ring 80.

Furthermore, by utilizing a low permeability mounting structure, i.e., the combination of sleeve 66 and plate 76, that together forms a generally U-shaped cross section closely disposed about the perimeter or resolver rotor 50 and positioning the mounting structure 66, 76 on a rotating member, i.e., hub 34, that has a significantly larger magnetic permeability, the hub 34 can, in combination with shielding members 82, 84, 86, substantially enclose resolver assembly 46 and thereby potentially enhance the electromagnetic shielding of resolver assembly 46 in some applications.

Sleeve 66 and plate 76 also have a low electrical conductance and, thus, also inhibit the transfer of electrical current from hub 34 to laminations 60. Laminations 60 forming resolver rotor 50 are thereby isolated from direct contact with conductive and/or high permeability materials which might otherwise interfere with magnetic flux developed within rotor 50.

Advantageously, sleeve 66 and plate 76 also isolate laminations 60 from electrical current in hub 34. For example, by forming sleeve 66 and plate 76 out of a material having an electrical conductance that is less than the electrical conductance of the material forming hub 34, sleeve 66 and plate 76 will substantially isolate laminations 60 from any induced electrical current in hub 34. In this regard, it is noted that electrical conductance is the inverse of the electrical resistance of an object. It is also possible for sleeve 66 and plate 76 to provide electrical isolation for laminations 60 when the material used to form sleeve 66 and plate 76 has a greater electrical conductance than hub 34 by providing sleeve 66 and plate 76 with an electrically non-conductive surface treatment or positioning a layer of non-conductive material between hub 34 and sleeve 66 and plate 76. For example, if sleeve 66 and plate 76 were formed out of an aluminum material having a greater electrical conductance than hub 34, sleeve 66 and plate 76 could be anodized to provide these parts with a surface layer that not only has a lower electrical conductance than hub 34 but is also substantially non-conductive.

While this invention has been described as having an exemplary design, the present invention may be further modified within the spirit and scope of this disclosure. This application is therefore intended to cover any variations, uses, or adaptations of the invention using its general principles.

What is claimed is:
1. An apparatus comprising:
 a rotating member;

a resolver having a resolver stator and a resolver rotor, the resolver rotor being mounted on the rotating member; and an annular mounting structure disposed on the rotating member wherein the annular mounting structure circumscribes the rotating member; the resolver rotor being disposed on the mounting structure whereby the mounting structure is disposed between and prevents direct contact between the resolver rotor and rotating member and wherein the mounting structure has a lesser magnetic relative permeability than the rotating member;

wherein the magnetic relative permeability of the rotating member is at least about 50 and magnetic relative permeability of the mounting structure is no greater than about 2.

2. The apparatus of claim 1 wherein the rotating member is a steel material.

3. The apparatus of claim 1 wherein the resolver rotor has a relative permeability of at least about 2,000.

4. The apparatus of claim 1 further comprising an electric machine having a rotor operably coupled with a stator, the electric machine rotor being mounted on the rotating member.

5. The apparatus of claim 1 wherein the mounting structure is formed out of a stainless steel.

6. The apparatus of claim 1 wherein the annular mounting structure comprises a sleeve having an L-shaped cross section and an annular plate, the resolver rotor being positioned radially outwardly of an axially extending leg of the sleeve and axially positioned between a radially extending leg of the sleeve and the plate.

7. The apparatus of claim 6 wherein the rotating member includes a radially extending surface and a substantially cylindrical surface which together define a substantially perpendicular angle, the sleeve being mounted on the cylindrical surface and seated against the radially extending surface, a press ring being secured on the cylindrical surface and axially securing the mounting structure and resolver rotor between the radially extending surface and the press ring.

8. The apparatus of claim 6 wherein the axially extending leg of the sleeve defines a slot and the resolver rotor defines a radially inwardly extending key positioned in the slot, engagement of the key and slot preventing rotational movement between the sleeve and resolver rotor, the sleeve being rotationally fixed to the rotating member.

9. The apparatus of claim 6 further comprising at least one electrically conductive and magnetically permeable shield member positioned to partially enclose the resolver; wherein the mounting structure has a magnetic relative permeability of no greater than about 2 and the rotating member has a magnetic relative permeability of at least about 50 and wherein the at least one shield member together with the rotating member substantially enclose the resolver.

10. An electric machine comprising:
a rotor operably coupled with a stator wherein the rotor includes a rotating member;
a resolver having a resolver stator and a resolver rotor, the resolver rotor being mounted on the rotating member and having a magnetic relative permeability of at least about 2,000;
an annular mounting structure disposed on the rotating member wherein the annular member circumscribes the rotating member; the resolver rotor being disposed on the mounting structure whereby the mounting structure is disposed between and prevents direct contact between the resolver rotor and rotating member; and
wherein the mounting structure has a magnetic relative permeability of no greater than about 2 and the rotating member is formed out of a steel material having a magnetic relative permeability of at least about 50.

11. The electric machine of claim 10 wherein the annular mounting structure comprises a sleeve having an L-shaped cross section and an annular plate, the resolver rotor being positioned radially outwardly of an axially extending leg of the sleeve and axially positioned between a radially extending leg of the sleeve and the plate.

12. The electric machine of claim 11 wherein the rotating member includes a radially extending surface and a substantially cylindrical surface which together define a substantially perpendicular angle, the sleeve being mounted on the cylindrical surface and seated against the radially extending surface, a press ring being secured on the cylindrical surface and axially securing the mounting structure and resolver rotor between the radially extending surface and the press ring.

13. The electric machine of claim 11 wherein the axially extending leg of the sleeve defines a slot and the resolver rotor defines a radially inwardly extending key positioned in the slot, engagement of the key and slot preventing rotational movement between the sleeve and resolver rotor, the sleeve being rotationally fixed to the rotating member.

14. The electric machine of claim 11 further comprising at least one electrically conductive and magnetically permeable shield member positioned to partially enclose the resolver; and wherein the at least one shield member together with the rotating member substantially enclose the resolver.

15. A method of manufacturing an apparatus comprising:
providing the apparatus with a rotating member;
providing a resolver having a resolver stator and a resolver rotor and mounting the resolver stator wherein the rotating member rotates relative to the resolver stator;
mounting an annular mounting structure on the rotating member wherein the annular mounting structure circumscribes the rotating member and wherein the mounting structure has a lesser magnetic permeability than the rotating member; and
mounting the resolver rotor on the annular mounting structure wherein the resolver rotor does not directly contact the rotating member;
wherein the annular mounting structure comprises a sleeve having an L-shaped cross section and an annular plate and wherein the steps of mounting the annular mounting structure and mounting the resolver rotor include mounting the resolver rotor on an axially extending leg of the sleeve and securing the resolver rotor between the annular plate and a radially extending leg of the sleeve.

16. The method of claim 15 wherein the rotating member includes a radially extending surface and a substantially cylindrical surface which together define a substantially perpendicular angle, the sleeve being mounted on the cylindrical surface and seated against the radially extending surface, and wherein the method further comprises securing a press ring on the cylindrical surface to axially secure the mounting structure and resolver rotor between the radially extending surface and the press ring, the sleeve and the annular plate being formed out of a stainless steel material.

17. An apparatus comprising:
a rotating member;

a resolver having a resolver stator and a resolver rotor, the resolver rotor being mounted on the rotating member; and an annular mounting structure formed of stainless steel disposed on the rotating member wherein the annular mounting structure circumscribes the rotating member; the resolver rotor being disposed on the mounting structure whereby the mounting structure is disposed between and prevents direct contact between the resolver rotor and rotating member and wherein the mounting structure has a lesser magnetic relative permeability than the rotating member.

* * * * *